Oct. 10, 1933.  L. C. REYNOLDS  1,930,252
TYPEWRITER ACCUMULATOR
Filed Nov. 26, 1930   5 Sheets-Sheet 1

INVENTOR
L. C. Reynolds
BY ATTORNEY
W. M. Wilson

Oct. 10, 1933.    L. C. REYNOLDS    1,930,252
TYPEWRITER ACCUMULATOR
Filed Nov. 26, 1930    5 Sheets-Sheet 2

INVENTOR-
Lyman C. Reynolds
BY
W. M. Wilson
ATTORNEY-

Oct. 10, 1933.  L. C. REYNOLDS  1,930,252
TYPEWRITER ACCUMULATOR
Filed Nov. 26, 1930  5 Sheets-Sheet 5

INVENTOR
L. C. Reynolds
BY ATTORNEY
W. M. Wilson

Patented Oct. 10, 1933

1,930,252

UNITED STATES PATENT OFFICE 1,930,252

TYPEWRITER ACCUMULATOR

Lynus Clyde Reynolds, Sweetwater, Tenn., assignor, by mesne assignments, to International Business Machines Corporation, New York, N. Y., a corporation of New York Application November 26, 1930
Serial No. 498,328

18 Claims. (Cl. 235—59)

The present invention relates primarily to record controlled machines in which a record medium such as a perforated web or tape exercises the control over the various operations of the machine particularly the selection of a totalizer for operation, the entry of amounts therein, and finally, the printing of the amounts entered in the totalizer upon a record sheet.

More particularly, the present invention relates to machines such as are described in detail in Letters Patent Nos. 1,270,471 and 1,349,024 granted to John C. Wahl which illustrate a well-known typewriting machine provided with columnar totalizers and one or more cross footing totalizers which has become known in the art as the "Remington" accounting machine.

The major object of the present invention is to provide an accounting machine of the type illustrated in the aforesaid patents with mechanism for controlling said machine by means of a perforated record tape such as may be produced by well-known perforating mechanisms with which cash registers and the like are sometimes equipped.

It has been proposed that cash registers be equipped with record perforating mechanisms capable of perforating data upon a narrow web or tape which is afterwards removed from the cash register and used to control an auditing machine. The auditing machine reads the perforations in the tape record produced by the cash register and converts said readings into differential movements of mechanism which selects a particular totalizer for operation and then enters the amount into said totalizer.

The record tape is usually divided into a plurality of fields, each field representing a single transaction, in which the data is represented by a plurality of columns, each column having one or more perforations. One column usually is used to designate the class of transaction, for instance whether it is a "Cash", "Charge", "Paid out" or "Received on account" transaction. Another column may be used to designate the clerk concerned in the transaction, such as "Clerk A" for instance, letters usually being used to designate the clerk. The remaining columns of the field represent the amount involved in the transaction and is expressed in terms of dollars and cents, pounds and shillings, or in some other monetary standard. A form of cash register arranged to produce a tape in which transactions are recorded by means of perforations is illustrated in United States Letters Patent No. 1,657,712, granted to M. M. Goldberg. An auditing machine adapted to read and classify items on record tapes produced by the said Goldberg patent is illustrated in Letters Patent No. 1,761,662 also granted to M. M. Goldberg. The problems of a cash register system utilizing perforated tapes to record items are fully explained in said patent, therefore a lengthy description of such problems and their solution will not be necessary herein except such as may be involved in the present invention.

This invention relates largely to machines for reading the record tape produced by a cash register or auditing machine and contemplates the use of a perforated record tape patterned after the well-known Hollerith system in which the field representing a given transaction or commercial operation comprises a plurality of record columns each divided into twelve index-point positions.

One of the most desirable features of an auditing machine is the ability of the machine to classify the items, cause their entry into the proper totalizer, and then produce a printed and classified list of the items, each item appearing in its related column upon the work sheet. Another desirable feature is the ability of the machine to record or provide for the recording of totals.

The present invention has for one of its main objects to provide mechanism for controlling an accounting machine in a manner to produce a printed record of the separate items represented by perforations in a record tape and arrange the items in columns according to a pre-selected classification.

Another object is to provide a machine capable of adding the items of each class and having provisions for printing the totals of all of the items of each class.

Various other objects, advantages and features will be pointed out in the following specification and claims or will be apparent after a study thereof and the accompanying drawings which show an illustrative embodiment of the invention.

In said drawings:

Fig. 1a is a front elevation of the accounting machine;

Fig. 2 is a vertical transverse section of the mechanism for feeding the perforated record tape and the driving connections for tabulating, the parts shown in this figure being located at the right of the typewriter as viewed in Fig. 1a;

Fig. 3 is a top plan view of the driving connections for the carriage and the record tape, this mechanism appearing to the right of the typewriting machine as viewed in Fig. 1a;

Fig. 5a is a fragmentary vertical section on the line 5a—5a in Fig. 1a;

Fig. 10 is a plan view of the control key-board used when totals are printed.

The present invention, for purposes of illustration only has been embodied in the machine shown and described in Letters Patent No. 1,349,024. Since the machine described in said patent is now well-known in the art no detailed description of its construction and operation will need to be given herein, therefore, said machine will be only briefly described.

The typewriter 11 has the usual alphabet keys 12 and numeral keys 13 and is provided with the paper carriage 14 arranged to be moved step-by-step from right to left whenever a key 12 or 13 is depressed. The carriage 14 has the usual platen 15 adapted to support the columnar work sheet and is operatively connected to a totalizer truck 16 carrying the vertical totalizers 17 of well-known construction. There is also provided a truck 18 adapted to carry the cross totalizers 19 and 20, the totalizer 19 being designed to accumulate a total representing "cash" transactions while the totalizer 20 accumulates the total of "charge" transactions in a manner to be more fully explained hereinafter.

A master wheel is provided for entering amounts digit-by-digit in the vertical totalizers 17, designated by the letters "A" to "J" respectively, and two other master wheels are provided for entering amounts in either of the totalizers 19 or 20. The mechanism which controls the amount entered in the totalizers 17 is contained within the casing 21 which is referred to generally as the vertical actuator. The mechanism for controlling the entry of amounts in the cross totalizers 19, 20 is similarly contained in a casing 22 and is generally termed the cross actuator. The vertical actuator 21 and the cross actuator 22 are mechanically coupled and under the control of the numeral keys 13 so that amounts may be entered in any vertical totalizer 17 and either or both of the cross totalizers 19, 20 simultaneously.

Mechanism is provided for controlling each master wheel so as to enter amounts by addition or subtraction or to disconnect the master wheel as desired, accordingly, there are three manual levers 23, 24, and 25, each settable to any one of three positions. The lever 23 is associated with the vertical actuator 21 and determines whether the vertical master wheel shall operate to add, not operate, or subtract, according to the position of the lever. The upper position of the lever determines adding, in the intermediate position neither adding nor subtracting can take place in any vertical totalizer 17, while in the lower position of the lever 23 subtraction takes place. The levers 24 and 25 in an exactly similar manner control the entry of amounts in the cross totalizers 19 and 20, respectively.

The entry of amounts in the cross totalizers 19 and 20 may also be controlled automatically by means of cams carried by the frames of totalizers 17. These cams operate upon mechanism which controls the direction of rotation of the master wheels for the cross totalizers 19, 20 in much the same manner as the levers 24, 25. A lever 27 determines whether the cross totalizers 19, 20 are to be controlled manually by the levers 24, 25 or automatically by the cams 26, the upper position of the lever 27 determining manual control while the lower position determines automatic control.

There is also provided a lever 28 intended primarily to enable the operator to correct errors due to entering an incorrect amount in any of the totalizers. The function of this lever is to reverse the control over the totalizers exercised by the levers 23, 24, 25 or by the cams 26. When the lever 28 is depressed the previous condition of the totalizer control mechanism will be reversed, that is, if the lever 23 was previously set in the "Add" position and the levers 24, 25 set in the "Subtract" position, the depression of lever 28 would cause subtraction to take place in a vertical totalizer and addition to take place in the cross totalizers. Advantage is taken of this feature to print totals from the cross totalizers and restore the totalizers to zero after a series of tabulations have been completed as will be more clearly explained hereinafter.

It will be understood that the usual mechanism is present for moving the truck 18 in step with the truck 16 as amounts are entered digit-by-digit in the vertical totalizers. The pick-up beam which is designated by reference numeral 302 in Fig. 22 of Patent No. 1,270,471 for operating the totalizers 17, 19, and 20 in unison and its mode of operation are fully described in the Wahl patents referred to hereinbefore. It will be sufficient to remark herein that when one of the vertical totalizers 17 enters the computing zone on the work sheet with the first column or highest order totalizer wheel in adding relation to the vertical master wheel the pick-up beam connects the truck 18 to the frame of the selected totalizer so that the selected totalizer 17 and both cross totalizers are moved as one.

The functions of the various control levers and other general features of the accounting machine have been briefly outlined, therefore, the present invention will now be described in detail.

It will be observed that the record medium used to control the accounting machine comprises a web or tape 29 (Fig. 9) divided into sections by lines 30, 31, the space between the lines comprising a field devoted to the data representing a single transaction. The tape 29 has been ruled with lines in Fig. 9 solely for convenience in explanation and the lines have been indicated by letters, numerals and names to assist in explaining the values of the various perforations. The twelve horizontal heavy lines represent the index-point value of a perforation present in any of said lines. The first vertical line or column 30 is never perforated and is provided for the purpose of insulating the totalizer selecting brushes or "clerk" brushes as they will be termed hereinafter during the time certain restoring operations take place.

The next column to the right of the column 30 contains a perforation 32 indicating the totalizer to be selected for entry of an amount, said perforation being located half-way between the heavy lines representing the index-point positions and may be placed in any one of ten positions, the perforation 32 signifying that totalizer "c" corresponding to clerk "c" is to be selected for entry of an item.

The third column, counting from left to right (Fig. 9) contains a perforation 33 in the twelfth index-point position signifying that the transaction is a "charge" transaction and that the change totalizer 20 is to be selected for entry of an item and that the "cash" totalizer 19 is to be disconnected. The next eight columns to the left represent the amount of the transaction which is "1973", the first four perforations 34 in the eleventh index-point position being used to control the operation of spacing bar 35 of the typewriter as will be pointed out later herein. The remaining perforations 36 controlling the operation of the numeral keys 13 to enter the amount 1973 in the last four denominational columns to the right (Fig. 1) of the totalizers "c" and 20. The column 31 represents the next dividing column separating the next succeeding transaction from the one under consideration.

Figures 2, 10:
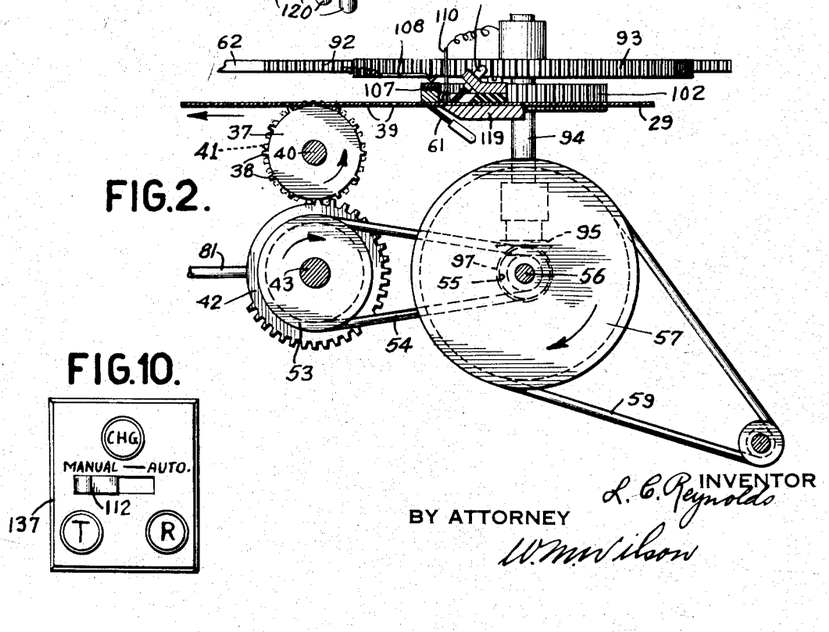
Figure 3:
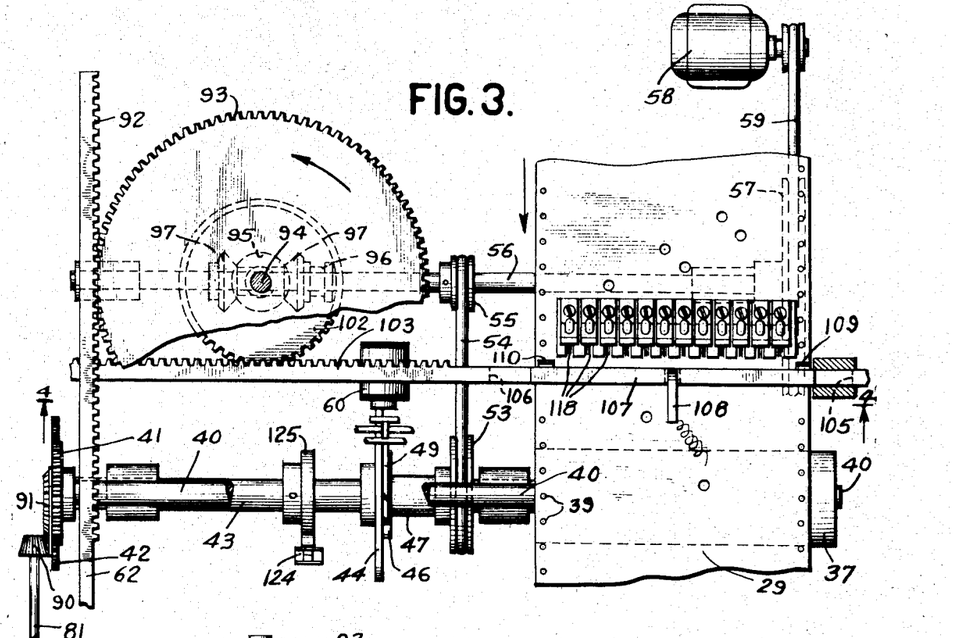

The tape 29 is fed intermittently from right to left (Fig. 2) or in the direction of the arrows in Figs. 2 and 3 by means of a feed roller 37 having sprocket teeth 38 engaging suitable holes 39 in the margins of the tape. The feed roller 37 is integrally mounted upon a shaft 40 supported in suitable bearings and is driven by a gear 41 which is carried by said shaft and arranged to be driven by a mutilated gear 42 mounted upon a second shaft 43 below the shaft 40. The shaft 43 may be coupled to a source of power such as a motor by means of a one-revolution clutch which comprises a disk 44 fast upon the shaft 43.

A pawl 45, pivotally mounted upon disk 44, has a tendency to engage the teeth of a ratchet wheel 46 mounted upon one end of a sleeve 47 freely revoluble upon shaft 43. This tendency to engage ratchet 46 is caused by a spring 48 which is attached to the pawl and to a stud carried by the disk. However, a spring-urged latch 49 pivoted upon a cross rod or stud 50 normally engages the tail 51 of pawl 45 and holds the hooked portion 52 thereof out of engagement with the teeth of the ratchet 46.

The other end of the sleeve 47 has integral therewith a pulley 53 connected by a belt 54 to a drive pulley 55 carried by a counter-shaft 56. A larger pulley 57 mounted upon the shaft 56 is driven by a motor 58 through a belt 59. The motor 58 operates continuously, therefore, it will be clear that the ratchet wheel 46 is likewise in continuous motion in the direction of the arrow around shaft 43 (Fig. 2). It will be clear that the release of latch 49 will cause the ratchet 46 to become operatively coupled to shaft 43 for the period of a single revolution at the end of which the tail 51 of pawl 45 will re-engage latch 49 and disengage the pawl 45 from ratchet 46 thereby uncoupling the driving connection from the motor to the shaft 43. For the purpose of releasing the latch 49 there is provided a magnet 60 which is controlled in a manner to be described later herein. During one complete revolution of the shaft 43 the tape 29 will be advanced the distance between the lines 30, 31 in Fig. 9, that is, the field representing a single transaction.

The tape 29 is moved from right to left (Fig. 2) past the analyzing brushes which read the various perforations column by column. The brushes 61, hereinafter to be called the clerk brushes, are mounted directly beneath the tape and press the tape against the underside of a movable contact bar to be more clearly explained hereinafter. There are as many brushes 61 as there are vertical totalizers 17 representing clerks, or ten in all. By making the tape 29 wider a larger number of totalizers may be used but for most purposes ten totalizers will be sufficient. The function of the brushes 61 is to control tabulating movements of the carriage 14 to bring any desired totalizer into the computing zone. Since this tabulating mechanism is one of the novel features of the present invention it will be described in detail.

Figure 1:
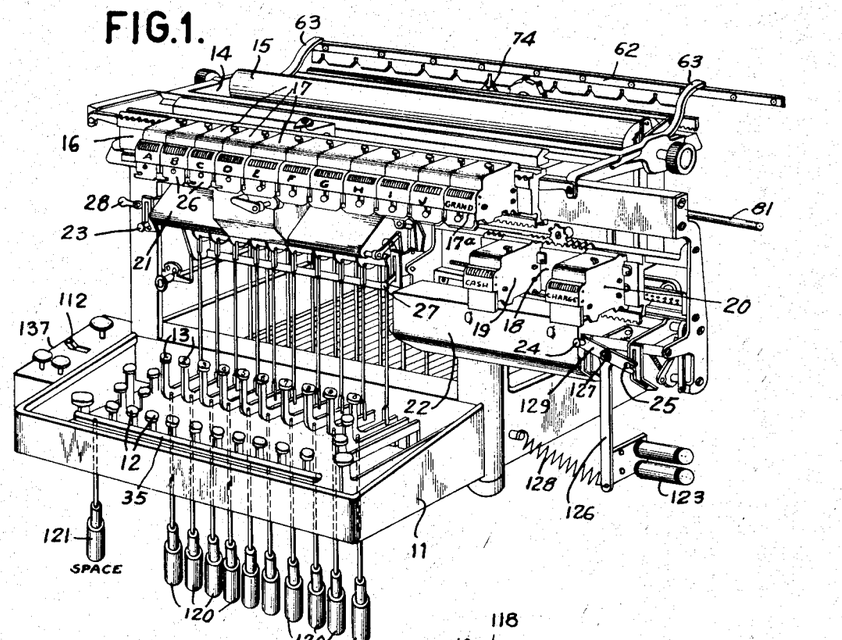
Fig. 1 is a perspective view of an accounting machine in which the present invention has been embodied.

The tabulating mechanism comprises a bar 62 rigidly carried by arms 63 attached to the side frames of the carriage 14 and extending rearwardly of the typewriter 11 (Fig. 1). The bar 62 is adapted to be locked to the carriage escapement rack 64 which is supported independently on arms 65 pivotally and slidably mounted upon a cross shaft carried by the typewriter main frame. The rack 64 has escapement teeth 66 meshing with the usual escapement pinion 67 of well known construction. The escapement mechanism may be of any desired construction and need not be described in detail herein. It will be understood that the rack 64 will be permitted to move one letter space to the left (Fig. 5) by means of the usual spring drum 68 whenever the shaft 69 (Fig. 5) is vibrated by the depression of a numeral key 13, an alphabet key 12, or the space bar 35 (Fig. 1).

Since the number of columns in the record tape devoted to the amount of the transaction does not exceed eight in the illustrative embodiment, the vertical totalizers 17 have only eight denominational orders. The cross totalizers 19, 20 may have any number of wheels within the limits of their distance apart upon the truck 18. Preferably the totalizers 19, 20 should have at least ten wheels since they must ordinarily have a greater adding capacity than the vertical totalizers 17. If desired the portion of the field devoted to the amount of the transaction may be increased in which case vertical totalizers must be used having more than eight orders.

The rack 64 is adapted to move through a relatively shorter distance than is usually the case since it will not need to move a number of tooth distances greater than the number of denominational orders in totalizers of the highest capacity ordinarily used as vertical totalizers. Since vertical totalizers having more than twelve orders are seldom used in practice, it will be unnecessary to provide for movement of the rack 64 more than twelve tooth spaces.

The carriage 14 is arranged to be moved by the motor 58 under control of the brushes 61 to bring it into position with the master wheels in operative relationship with the highest order wheel of the selected vertical totalizer 17 and the corresponding wheels of the cross totalizers 19, 20 and will then be locked to the escapement rack 64. The mechanism for locking the carriage 14 to the escapement rack 64 will be described first then the mechanism for driving the carriage to effect selection of any vertical totalizer will be described.

The bar 62 has attached thereto a bar 70 provided with notches 71 having vertical portions and inclined cam surfaces. There are as many notches 71 as there are vertical totalizers 17, a sufficient number of notches being provided in the illustrative embodiment to allow for the maximum number of totalizers that can be mounted upon the truck 16. Pivotally mounted upon the escapement rack 64 is a locking pawl 72 having an upwardly extending portion 74 which is narrowed to a width sufficient to enter the vertical portion of a notch 71 so as to lock the carriage to the escapement rack 64. A spring 75 interposed between a lug formed in the rack 64 and a lug in the pawl 72 normally urges the pawl 72 downwardly so that a roller 76 carried by the pawl rests upon a flange formed in the top edge of a spring-urged plate 77 slidably mounted in fixed guides 78.

The plate 77 has fixed thereto a rack 79 with which meshes a pinion 80 mounted upon a cross shaft 81 journalled in fixed bearings carried by the typewriter frame and by the frame supporting the tape driving mechanism. When the carriage is being shifted to position a totalizer 17 for entry of a transaction, the plate 77 is held depressed by means of a latch 82 which may be released by energization of a magnet 83. The rack 64, during the period mentioned, occupies its extreme right position (Fig. 5) with a projection 84, formed in said rack against a fixed stop 85, a similar stop 86 limiting the leftward movement of the rack to fourteen letter spaces. The flanged part of the plate 77 is long enough to prevent the roller 76 from dropping below said flange when the rack is in either limit of movement.

A crank 87 formed in the shaft 81 is connected by a flexible cord or wire 88, passing over a pulley 89, to the rack 64 for the purpose of restoring the rack to its normal position after an entry has been made in a vertical totalizer 17. The shaft 81 has fixed thereto on its right end (Fig. 5) a bevel pinion 90 adapted to mesh with a bevel rack 91 carried by gear 42. It will be clear that toward the last part of the revolution of gear 42 the rack 91 will engage and turn the bevel pinion 90 and shaft 81 thereby drawing down plate 77 to latching position and also drawing rack 64 to the right (Fig. 5) until the lug 84 strikes the stop 85. The wire or cord 88 will be slackened up on the return or upward stroke of crank 87 and will remain slack enough to permit the rack 64 to move at least fourteen letter spaces to the left.

Figures 1A, 5A:
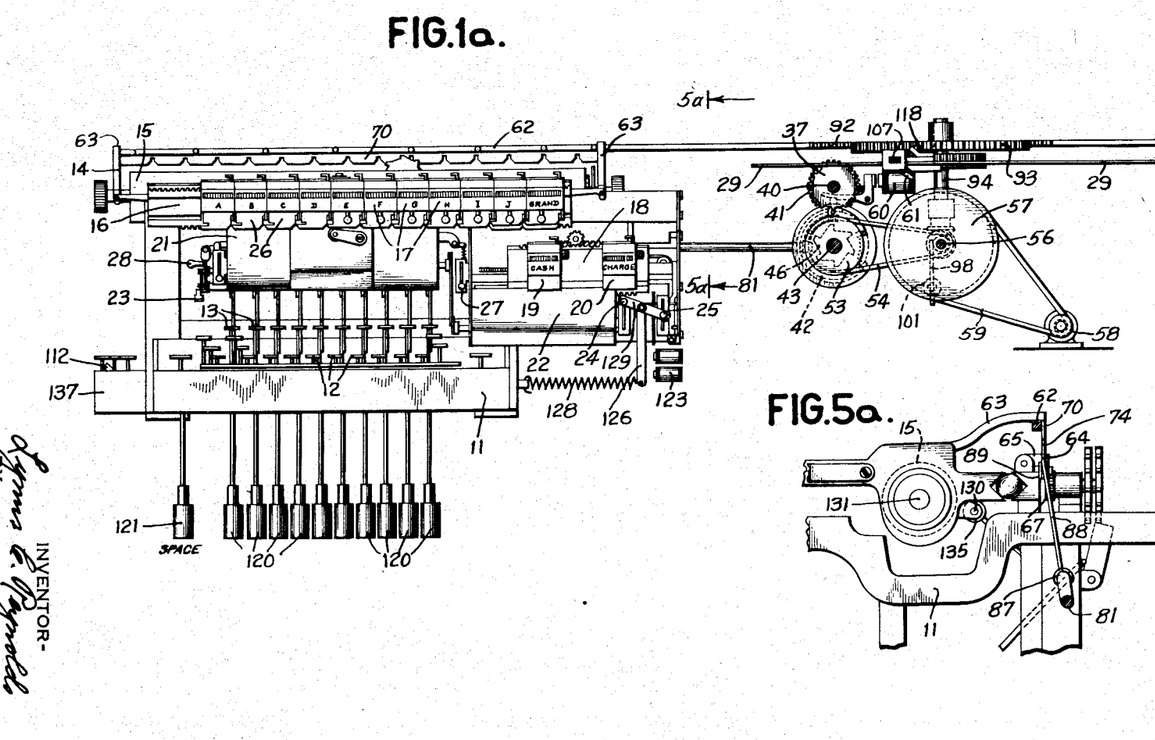
Figure 4:
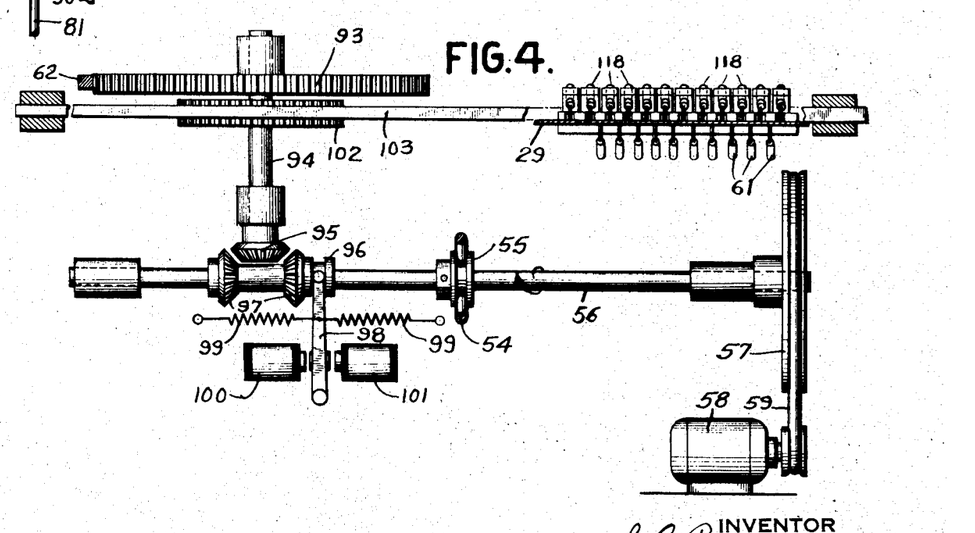
Fig. 4 is a vertical section on the line 4—4 of Fig. 3.

The mechanism for moving the carriage 14 to position a desired totalizer in the computing zone comprises a gear shift jointly controlled by the position of the carriage and the clerk perforation 32 and is adapted to drive the carriage either to the right or to the left after an adding operation in any totalizer according to whether the next totalizer selected is to the right or the left of the last totalizer selected for operation. The bar 62 is extended to the right (Fig. 1a) and is provided with rack teeth 92 with which meshes a large gear 93 (Figs. 2, 3, and 4) fast on a vertical shaft 94 journalled in fixed bearings, suitable guides carried by the framework of the tape feeding mechanism serving to support the bar 62. The shaft 94 has mounted on its lower end a bevel pinion 95 with which cooperates a shiftable element 96 carrying two oppositely facing bevel gears 97 and is slidably mounted upon shaft 56 but splined thereto. Normally neither of the bevel gears 97 mesh with the pinion 95 so that the shaft 56 turns idly without affecting the shaft 94.

The element 96 has a groove with which cooperates the upper end of a shift lever 98 normally held in a vertical position by means of two opposed springs 99 attached to the lever 98 and fixed pins carried by the framework. The shift lever 98 may be moved to the left or to the right (Fig. 4) by means of magnets 100, 101 which are jointly controlled by the position of the carriage and the perforation in the tape representing the totalizer to be selected to receive an item. Since the shaft 56 is continuously turning in the direction of the arrow in Fig. 4 it will be obvious that energization of magnet 100 will cause the right hand bevel gear 97 to mesh with the pinion 95 and thereby drive the gear 93 in a counter clockwise direction with the result that the carriage 14 will be moved to the left (Fig. 1). When the magnet 101 is energized the left hand gear 97 will mesh with the pinion 95 and, as a consequence, the carriage will be moved to the right.

The magnets 100, 101 are controlled by cooperation of a perforation present in the tape representing a clerk with a member controlled by the carriage. A gear 102 fast upon shaft 94 meshes with rack teeth on a bar 103 slidable in guides carried by the framework. The front end of the bar extends over the clerk's brushes 61 and has three contact members arranged thereon, the construction and arrangement of which may be best understood by reference to Fig. 8 which shows the bar as it would appear viewed from one side.

The bar is provided with three contacts, the center contact 104 being of a width about half the distance between two adjacent index-point positions or even less while the other two contacts 105, 106 are at least as long as the distance between the "9" and the "12" index-point positions and insulated from the contact 104. The said contact 104 has a long contact strip 107 connected thereto and arranged on the top surface of the bar 103. Three brushes 108, 109, and 110 cooperate with the respective contacts 104, 105, and 106 and are carried by brush holders supported upon and insulated from the framework. The three contacts 104, 105 and 106 overlie the brushes 61 so that a perforation present in the tape 29 representing a clerk will permit a brush 61 to pass through said perforation and rest upon one of the three contacts 104, 105 or 106 depending upon the position of the carriage. The ratio of the gearing is such that the central contact 104 will cooperate with the corresponding brush 61 whenever a totalizer 17 is in readiness for an adding operation, that is, if the "A" totalizer 17, for instance, has its highest order wheel operatively connected to the vertical master wheel the "A" brush 61 will rest upon the contact 104 when a perforation is present in the "A" index-point position.

The brush 109 is connected to the magnet 100 which controls movement of the carriage 14 to the left while the brush 110 is connected to the magnet 101 which controls movement of the carriage to the right. The brush 108 is connected by a line 111 to two terminals of a double pole, double throw switch 112, normally set in the position indicated by solid lines in Fig. 8.

The magnets 100, 101 are connected to a line 113 which leads to one of the supply wires 114 connected to a source of current 115 while the magnets 60, 83 hereinbefore mentioned, are connected in parallel to the supply wire 114 and to the common terminals of switch 112 so that in effect the magnets 60, 83 are in parallel with each other and in series with the brush 108 and contact 104. The clerk's brushes 61 have a common connection through a line 116 to the other supply wire 117 leading from the source of current 115.

Figure 8:
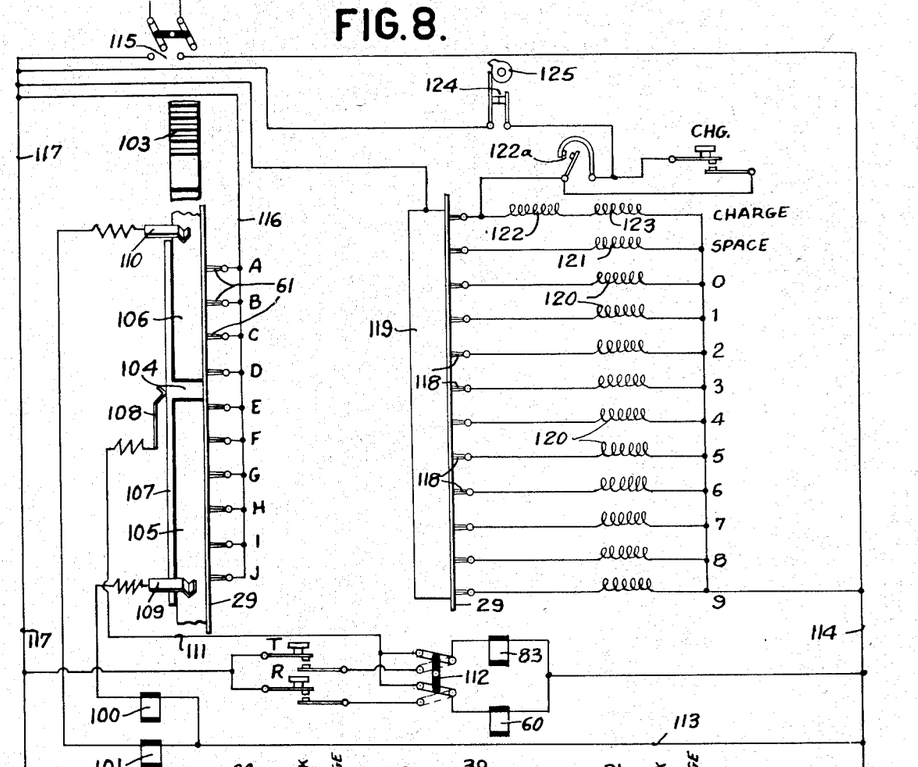
Fig. 8 is a circuit diagram of the apparatus.

The index point perforations representing the amount, spacing of the amount, and the nature of the transaction are read by a series of twelve brushes 118 mounted above the tape 29 and displaced from the brushes 61 a distance equal to the spacing of the vertical columns of index-point positions. The brushes 118 are designed to read "Charge" perforations 33 at the same time the brushes 61 read the "Clerk" perforations 32. These brushes 118 press the tape 29 against a contact bar 119 which is connected to the left supply wire 117 (Fig. 8). Each of the lower ten brushes 118 in (Fig. 8) or the right hand ten brushes (Figs. 3 and 4) is connected to a solenoid 120 which operates the typewriter numeral key 13 corresponding in value to the index-point position indicated by the vertical column of numerals in Fig. 9, the lowest solenoid, for instance, operates the "9" key. The eleventh brush 118 is connected to a solenoid 121 which operates the space bar 35. The twelfth or top brush 118 is connected to a relay 122 and a magnet 123 which controls the "Cash" and "Charge" totalizers 19 and 20. The solenoids 120, 121, and magnet 123 have a common connection to the left supply wire 114.

Energization of the relay 122 closes contacts 122a and establishes a holding circuit for said relay and the magnet 123 through cam contacts 124 which are operated by a cam 125 mounted upon the shaft 43. The contacts 124 open at about the time the rack 91 engages the bevel pinion 90 and reclose before the brush connected to magnet 123 and relay 122 comes into position to read the clerk perforation in the next succeeding field on the tape 29. When the magnet 123 is energized, it rocks an arm 126 (Fig. 1), pivoted at 127 to the frame supporting the totalizer truck 18, to the right against the tension of a spring 128 attached to the frame of the typewriter 11. The arm 126 has rigidly connected thereto a cross bar 129 which is journalled in the pivot 127 and is forked or slotted at both ends to engage the levers 24, 25. Normally the spring 128 holds the arm 126 in the position shown in Fig. 1 in which position the lever 24 is set to adding condition while the lever 25 is set to non-adding or disconnect position. When the arm 126 is swung to the right by the magnet 123, the lever 24 is shifted to the disconnect position while lever 25 is shifted to adding position. It will be seen, therefore, that normally adding will take place in the totalizer 19 while the totalizer 20 will be disconnected, this condition being reversed when a perforation representing a "charge" transaction is present.

Figures 5, 6, 7:
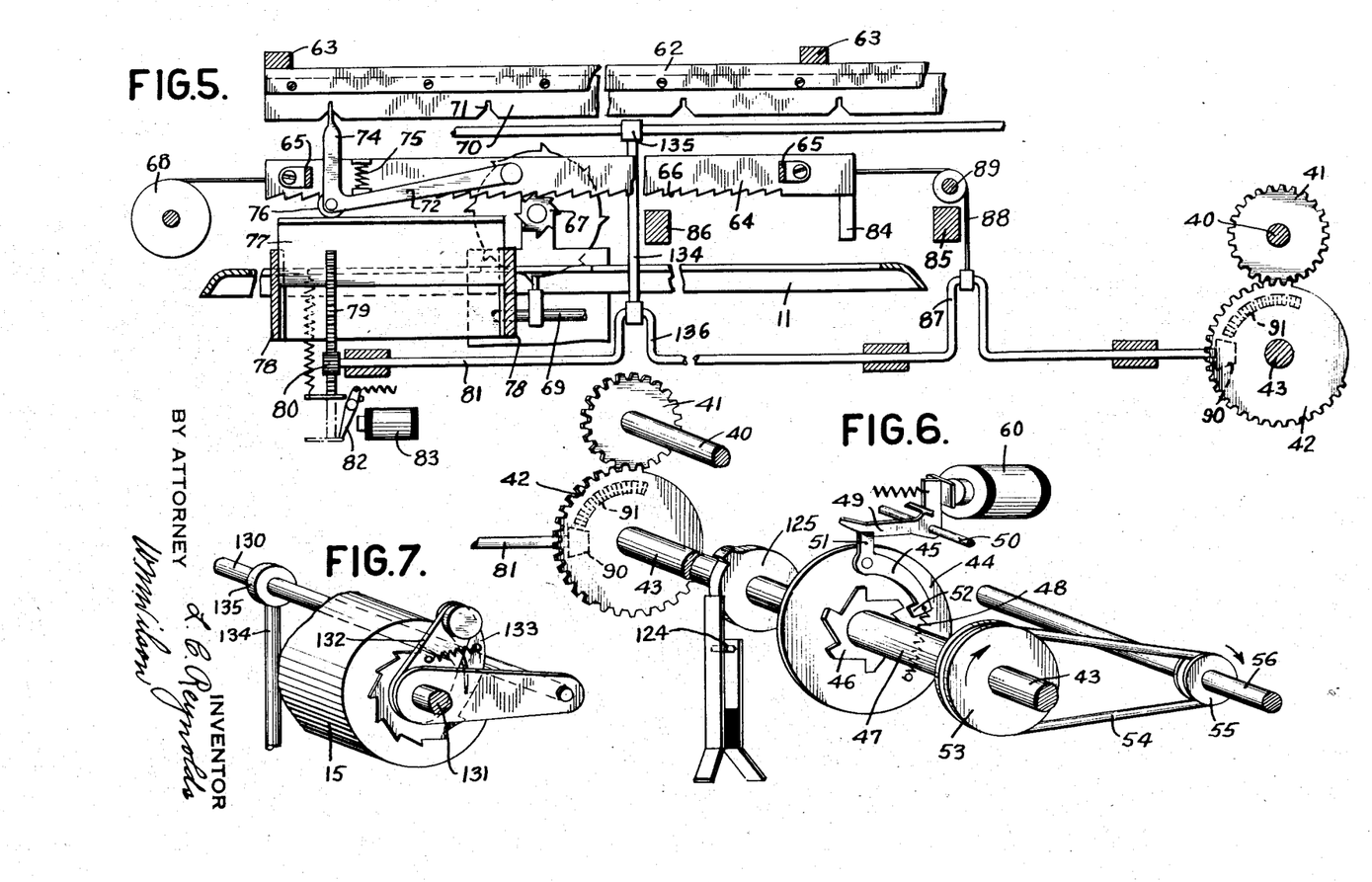
Fig. 5 is a diagrammatic view of the carriage aligning mechanism, the escapement mechanism, paper feeding mechanism, and the mechanism for releasing and restoring the aligning mechanism, certain of the parts being shown in operated position.
Fig. 6 is a perspective view of the clutch mechanism and driving connections for the record tape.
Fig. 7 is a detail view in perspective of the paper feeding mechanism.

The work sheet is fed one line space during each transaction cycle by means of a bail 130 pivotally mounted upon the platen shaft 131 (Fig. 7). Rigid with the right arm of bail 130 is an arm 132 carrying a spring pressed paper feeding pawl 133. It will be obvious that the work sheet will be moved a line space each time the bail 130 is drawn downwardly against the tension of a spring (not shown). This result is obtained by means of a link 134 having an eye 135 which slides freely over the bail 130 as the carriage moves transversely of the machine. The lower end of the link 134 is connected to a crank 136 formed in shaft 81. It is clear that each time the shaft 81 revolves to restore the plate 77 to latched position the link 134 will be drawn down a distance sufficient to feed the work sheet one line space.

The specific construction of the various parts having been described, the operation of the present invention when under the control of the perforated record tape will now be explained.

It will be assumed that the tape 29 has been placed in the machine and arranged so that the brushes 61 are cooperating with the column having a clerk perforation 32, the various parts of the machine standing in normal position with the plate 77 latched down. The lever 27 is set to "manual" position, the lever 23 is set to "add" while the lever 28 is not disturbed from its normal upper position. The switch 112 is set to the position shown in Fig. 8 and the main switch closed, thereby connecting supply wires 114, 117 to the source of current. It will be assumed that the carriage 14 has been left with the vertical master wheel in a position half way between the highest order wheels of the "D" and "E" clerks' totalizers 17 as in Fig. 8.

The clerk perforation 32 in the "C" clerk index-point position (Fig. 9) will permit a circuit to be established from wire 117, line 116, clerk brush 61 in the "C" index-point position, contact 106, brush 110, magnet 101, and line 113, to the wire 114, thereby energizing magnet 101 and causing the lever 98 to shift the element 96 to bring the left bevel gear 97 (Fig. 4) into mesh with the bevel pinion 95. The coupling of the continuously turning shaft 56 to the shaft 94 by the meshing of said gears causes the carriage to move to the right (Fig. 1), the contact 104 moving forwardly (Fig. 8) or to the left (Figs. 3 and 4) until the brush 61 which passes through the perforation 32 touches the contact 104. A circuit is then established as follows: wire 117, line 116, brush 61 in the "C" index-point position, contacts 104, 107, brush 108, line 111, switch 112 (in the solid line position), and magnets 60 and 83, to the wire 114.

Energiaztion of magnets 60 and 83 effects release of the latch 82 thereby causing the carriage (which is now in position with the vertical master wheel meshing with the highest order wheel of the "C" clerk's totalizer) to become locked to the escapement rack 64 and also effects release of the pawl 45 thereby establishing a driving connection between shaft 43 and the continuously turning ratchet wheel 46. As a consequence the driving roller 37 starts feeding the tape 29 to the left (Fig. 9) or in the direction of the arrow in Fig. 3.

Simultaneously with the establishment of a circuit through the clerk perforation 32 a circuit is established through the "charge" perforation 33 as follows: wire 117, contact 119, brush 118 through the "charge" perforation, relay 122, and magnet 123 to the wire 114 thereby closing contacts 122a to establish the holding circuit for relay 122 and magnet 123. The energization of magnet 123 shifts the arm 126 to the right (Fig. 1) to disconnect the "cash" totalizer 19 from its actuator and condition the "charge" totalizer for addition.

The tape 29 has now begun to move so that the four perforations 34 will be successively read by the brush 118 controlling the space bar and consequently the said space bar will be vibrated four times in succession thereby causing the carriage 14 to escape four letter spaces to the left (Fig. 1) to bring the totalizer wheel in the thousands place of the totalizer "C" into mesh with the vertical master wheel, the cross totalizer truck being likewise positioned with the corresponding order wheel on each totalizer 19, 20, meshing with their respective master wheels. The totalizers are now ready for the adding operation. The next four perforations 36, representing the amount 1973, will pass successively beneath the brushes 118 and cause the corresponding numeral keys 13 to be operated in like succession so that the said amount will be added in the totalizer and at the same time is printed in the appropriate column on the work sheet.

As shown in Fig. 6, the teeth in mutilated gear 42 normally mesh with the teeth in gear 41 and are so arranged that, when the magnet releases latch 49 and pawl 45, the shaft 40 will first be moved at a uniform rate to feed the tape 29 past the brushes 118 then, after the last perforation 36 has been read by said brushes, the teeth in gear 42 will cease to mesh with the teeth in gear 41 and the feed of the tape 29 will be interrupted. Near the end of the revolution of shaft 43 the teeth in gear 42 will again mesh with the teeth in gear 41 and the tape 29 will be fed a further increment sufficient to bring the brushes 61, 118 into position to read the perforations 32, 33 in the "clerk" and "charge" columns, respectively, of the next adjacent field on the right (Fig. 9) at which point the pawl 45 will become disengaged and the feed of the tape 29 will cease.

Figure 9:
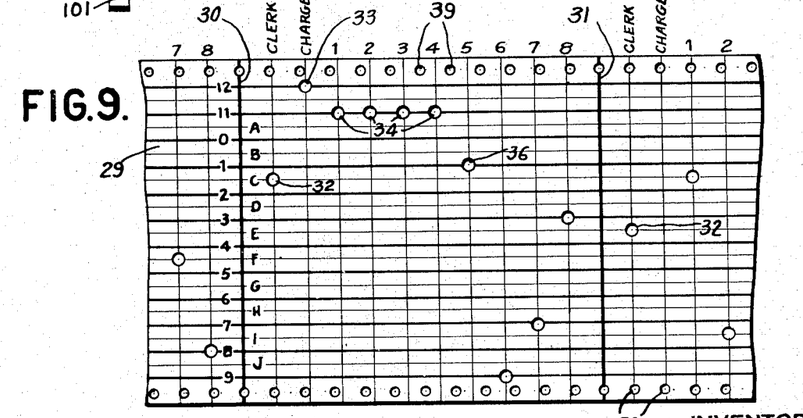
Fig. 9 is a section of the record tape showing the arrangement of the perforations in the field representing a single transaction and portions of the next adjacent fields.

When mutilated gear 42 ceases to drive the tape owing to the teeth in the gear 42 passing from engagement with the teeth in gear 41 driving the roller 37, the tape 29 will come to rest with the brushes 118 in the column represented by the line 31. At about this point the cam contacts 124 will be opened thereby breaking the holding circuit for relay 122 and magnet 123 permitting the spring 128 to return the arm 126 to normal position. The gear 42 will continue to turn, however, consequently the bevel rack 91 will engage and turn bevel pinion 90 and shaft 81 thereby drawing down the plate 77 into a position to be held by the latch 82, drawing down link 134 to advance the work sheet a line space, and drawing down the cord 88 to return the escapement rack to its normal position with lug 84 against the stop 85. The bevel rack 91 will become disengaged from bevel pinion 90 when the rack 64 is completely returned to normal position while the teeth of the gear 42 will again mesh with gear 41 and move the tape a distance sufficient to bring the brushes 61 into position to read the clerk's perforation in the next adjacent field to the right (Fig. 9). At about this point the tail 51 in pawl 45 will engage the latch 49 and cause the disconnection of the shaft 43 from the driving ratchet 46.

The same cycle of events will now be repeated, the clerk perforation in the next adjacent field causing the carriage to be tabulated to select a new totalizer for adding, the presence or absence of a perforation in the twelfth index-point position in the "charge" column determining whether adding is to take place on totalizer 20 or totalizer 19, and the other perforations determining the amount entered and the positioning of the master wheels at the proper denominational order of the totalizers 17, 19 and 20.

It might have happened that the perforation representing a clerk was present in the "H" index-point position in the field corresponding to the transaction initially described to illustrate the operation of the machine. In such a case the circuit first established would be made through contact 105, brush 109, and magnet 100 instead of through contact 106, brush 110 and magnet 101, and, as a result, the element 96 would be shifted further to the left (Fig. 4) to bring the right bevel gear 97 into mesh with bevel pinion 95 so that the carriage 14 would move to the left (Fig. 1) and bar 103 would move to the right (Figs. 3 and 4) or downwardly (Fig. 8) until the contact 104 completed a circuit through the appropriate brush 61 to lock the carriage 14 to the rack 64 and initiate the feeding of the tape 29.

It is desirable that means be provided for clearing the totalizers, printing the totals therein, and determining the total sales, that is, the total of the amounts indicated by the wheels of totalizers 19, 20. The foregoing results are usually accomplished in the patents cited herein by setting the levers 23, 24, 25 to subtraction and then manually typewriting the amount standing upon the totalizers. This process is fully described in the patents to Wahl hereinbefore mentioned consequently detail explanation need not be given here. Since in the present construction neither of the levers 24, 25 can be set to subtracting position, certain modifications in the usual procedure must be made in order to secure the desired results. Also, since the carriage escapement mechanism has been modified to adapt the Wahl mechanism to be controlled by the tape 29, independent means must be provided to release the latch 74 when it is desired to manually typewrite the total standing on the totalizer and to restore said latch when each total printing operation has been effected. Also independent means must be provided to condition the totalizer 20 for performing subtraction since this totalizer is normally in a neutral condition.

Attached to the left side of the typewriter and near the front (Fig. 1) is a control box 137, illustrated in plan view in Fig. 10. The switch 112 is mounted in said box and can be set to "manual" position for total printing by manual operation of the keys 13 or in the alternative position for automatic control of the adding and numeral printing mechanism by the record tape 29. The latter position is indicated by the abbreviation "auto". The box 137 contains three pairs of contacts each controlled by one of three keys "CHG.", "T" and "R". When the lever controlling switch 112 is in the "manual" position the said switch occupies the position shown in broken lines in Fig. 8 and connects the magnets 60 and 83 in series with the respective normally open contacts controlled by keys R and T. The contacts controlled by the key CHG. are normally open and connected in parallel with the contacts 122a of relay 122. The function of the key T is to release the latch 82 to permit the carriage to be locked to the escapement bar 64 when it is desired to manually print the totals. The key R effects release of the one-revolution clutch to bring about a restoration of the plate 77 in order to permit manual shifting of the carriage to a new position. When the key CHG. is depressed it closes its contacts which sets up the circuit through relay 122 and magnet 123 thereby conditioning the actuating mechanism to add in the totalizer 20.

It will be assumed that the passage through the machine of one or more record tapes has caused the accumulation of totals in each of the totalizers 17, 19, and 20, while the "grand" totalizer 17a (Fig. 1) is clear, the totals being as follows:

```
  A    B     C     D    E     F     G    H    I
1975 6032 11907 4056 91262 1976 6792 4651 9136
          J    Cash  Charge
        6750 75360  69177
```

The first step is to bring the "grand" totalizer 17a to the computing zone by manually shifting the carriage 14 until the appropriate numerical order of the said totalizer meshes with the vertical master wheel, the carriage being first moved to a position to cause the pick-up beam to couple the cross totalizer truck 18 to the main totalizer truck 16. The lever 27 is raised to the "manual" position, the lever 23 is depressed to "subtract" position, and the correcting lever 28 depressed far enough to latch itself. These operations condition the actuating mechanism to add in the "grand" totalizer and subtract in the "cash" totalizer 19. The lever controlling switch 112 is thrown to the "manual" position and the key T depressed thereby effecting release of latch 82 and causing the locking of carriage 14 to the escapement rack 64. The amount 75360 is then typed out manually with the keys 13. This operation adds 75360 to the grand totalizer 17a and clears the cross totalizer 19. The key R is then depressed to restore the plate 77 and the escapement rack 64 to normal position. The same procedure is followed to clear the "charge" totalizer 20 and results in the adding of the amount 69177 to the amount already entered in the grand totalizer 17a, the key CHG. being depressed before typing the "charge" total in order to disconnect the "cash" totalizer 19 from the actuator and condition the "charge" totalizer for subtraction. The grand totalizer 17a now indicates the total 144537 which represents total sales.

The next operation is to clear the grand totalizer and transfer the total therein to the "cash" totalizer 19. This is accomplished by releasing the lever 28, thereby conditioning the actuators to subtract in the grand totalizer and add in the "cash" totalizer 19, and then following the same procedure as before, that is, manipulation of the carriage 14 to pick up the cross totalizer truck and bring the vertical master wheel into mesh with the proper denominational order in the grand totalizer, depression of key T, typing of the amount 144537, and depression of key R.

The remaining series of operations is to clear each vertical totalizer 17 and print the total therein. This is done by depressing lever 28, setting lever 23 to "add" position, manipulation of the carriage to pick up the truck 18 and bring the vertical master wheel in mesh with the proper denominational order of the totalizer 17 to be cleared, depression of key T to connect the carriage 14 to the escapement rack 64, typing of the amount in the totalizer to be cleared and, finally, depression of key R to restore the escapement rack 64 and plate 77. If it is desired to have the totals of the vertical totalizers "A" to "J" appear on the same line it will be necessary to line space the work sheet backwardly after each total is printed, or, if desired, mechanism may be provided to disable the paper feeding pawl 133.

When all the totals in the vertical totalizers 17 have been printed in this manner the "cash" totalizer 19 should be clear and show a row of zeros since each total printed is simultaneously subtracted from the total sales temporarily entered in the totalizer 19. It will be seen, therefore, that there is a positive check on the accuracy of the whole series of total printing operations.

The present invention has been shown and described with reference to a specific form of embodiment and applied to a particular type of accounting machine, however, it is understood that it is not limited to the precise form shown as it may be modified in details or applied to other types of accounting machines as well in order to suitably adapt it to the varying conditions met in practice, all such modifications and adaptations falling within the scope of the following claims:

1. In an accounting machine the combination of a traveling carriage freely movable in two directions, a plurality of totalizers carried by said carriage, a record medium, means called into action by classification designations in said record medium for moving said carriage in one or the other of said directions to directly select a totalizer for operation, and means controlled by item designations in the record medium for operating the selected totalizer to enter in the latter the item represented by said item designations.

2. In an accounting machine the combination of a plurality of totalizers, operating mechanism therefor, an intermittently moving record medium, means controlled by said record medium while said medium is at rest for determining the totalizer to be operated, and means controlled by said record medium while it is in motion for controlling said operating mechanism.

3. In an accounting machine the combination of a plurality of totalizers, a record medium for controlling entry of amounts in said totalizers, means controlled by said record medium while it is at rest for determining the totalizer to be operated, means for feeding said record medium while amounts are being entered in the totalizer selected, and means controlled by the first named means for initiating the operation of the feeding means.

4. In an accounting machine the combination of a traveling carriage, a plurality of totalizers carried thereby, escapement mechanism for said carriage normally disconnected therefrom, a record medium for controlling selection of a totalizer to be operated, and means jointly controlled by said carriage and said record medium for connecting said escapement mechanism to said carriage.

5. In an accounting machine the combination of a traveling carriage, a plurality of totalizers carried thereby, a record medium, means controlled by said record medium for entering amounts in said totalizers, means controlled by said record medium for moving said carriage to bring a totalizer predetermined for operation into the zone of operation of said amount entering means, escapement mechanism normally disconnected from said carriage and operated by said amount entering means, and means jointly controlled by said carriage and said record medium for connecting said escapement mechanism to said carriage when the totalizer predetermined for operation is in the zone of operations of said amount entering means.

6. In an accounting machine the combination of a plurality of totalizers, an intermittently moving record medium, common operating means for said totalizers controlled by said record medium while it is in motion, totalizer selecting means controlled by said record medium while it is at rest for bringing one of said totalizers into the zone of operation of said common operating means, and means controlled by the totalizer selecting means for intermittently moving said record medium.

7. In an accounting machine, a traveling carriage, a plurality of totalizers carried thereby, a record medium, actuating mechanism for said totalizers including a series of keys controlled by said record medium, escapement mechanism normally disconnected from said carriage, means controlled by said record medium for selecting a totalizer to be actuated, and means jointly controlled by the record medium and the totalizer selecting means for connecting said escapement to said carriage when the selected totalizer is in position to be actuated.

8. In an accounting machine the combination of a traveling carriage, a plurality of totalizers carried thereby, a record medium, means controlled by said record medium for operating said totalizers, means for driving said carriage in either direction to bring a desired totalizer into operative relation with said operating means, and means jointly controlled by the position of said carriage and the position of an index point in said record medium for causing said driving means to bring the desired totalizer directly into operative relation with the operating means.

9. In an accounting machine, a traveling carriage, escapement mechanism normally disconnected from said carriage, means for moving said carriage in one direction or another, a record medium, means jointly controlled by the carriage and the record medium for determining the direction in which said carriage is to be moved, and means controlled by said last named means for connecting said carriage to said escapement.

10. In an accounting machine, a traveling carriage, means for moving said carriage in two directions, a record medium, and means jointly controlled by the record medium and said carriage for determining the direction of movement of the carriage.

11. In an accounting machine, a traveling carriage, means for moving said carriage in two directions comprising a constantly driven power shaft and a normally ineffective reversing gear for connecting said power shaft to said carriage, a record medium, and means jointly controlled by said carriage and an index point in said record medium for operating said reversing gear in accordance with the position of said index point.

12. In an accounting machine, a traveling carriage, a record medium, means controlled by said record medium for moving said carriage directly from one point to another according to the location of an index point in said record medium, and means jointly controlled by said carriage and said record medium for arresting said carriage when the latter has reached the desired position.

13. In an accounting machine, the combination of a traveling carriage, a plurality of totalizers carried thereby, a record medium, means controlled by said record medium for operating said totalizers, means controlled by said record medium for moving said carriage directly from one point to another to bring a desired totalizer into the zone of operation of said totalizer operating means according to the location of an index point in said record medium, and means jointly controlled by said carriage and said record medium for arresting said carriage when the desired totalizer is in the computing zone.

14. In an accounting machine, a movable element, totalizers mounted on said element, amount entering mechanism for entry of amounts in any selected totalizer, a power drive for moving said element relative to the amount entering mechanism to select a totalizer to receive entries from the amount entering mechanism, including connections for moving the movable element in either of two directions; circuits for controlling said connections to determine the direction of movement of said element in response to the power drive, and a plurality of totalizer selecting circuits operative to control said first named circuits to determine both the direction and extent of movement of the element to select a totalizer for receiving entries.

15. In an accounting machine, a support, totalizers mounted on said support, item entering mechanism common to said totalizers, said support and item entering mechanism being movable relative to each other in two directions to select a totalizer for actuation by the item entering mechanism, a power drive, reversible connections to the power drive for causing relative movement between the support and item entering mechanism, control circuits for said connections to determine the direction of said relative movement, and a series of totalizer selecting circuits for controlling the first named circuits said selecting circuits controlling both the extent of such relative movement and its direction.

16. In an accounting machine, a plurality of totalizers, a support therefor, item entering mechanism, said support and item entering mechanism being relatively movable in either of two directions to select one of the totalizers for actuation by said item entering mechanism, a reversible power drive for causing relative movement between the support and item entering mechanism to select a totalizer for actuation, a plurality of control circuits for controlling the power drive to reverse its direction of movement, and totalizer selecting circuits controlling the first named circuits and operative to determine the extent of relative movement and direction thereof necessary to select a totalizer for actuation.

17. In a machine of the class described, item entering mechanism, a frame carrying several totalizers, said frame being movable in either of two directions to correlate a selected totalizer with the item entering mechanism, reversible means for causing movement of said frame in either direction, and means including a plurality of circuits for determining the direction of movement of the reversible means for causing the movement of the frame from any previous position in the shorter direction to select a totalizer for actuation by the item entering mechanism.

18. An accounting machine comprising class totalizers, a support in which said totalizers are mounted, item entering mechanism for entering amounts in any selected totalizer; means for moving said support relative to the item entering mechanism to bring a totalizer into coaction with the item entering mechanism to receive an entry from said mechanism including a uni-directional driver, normally ineffective reversing gears connecting the driver and support to move the latter in either of two directions relative to the item entering mechanism, and selectably operable direction controlling circuits each having means for operating one of said reversing gears; and totalizer selecting circuits, each associated with one of the totalizers and effective when active to determine the extent of movement of the support necessary to bring the associated totalizer into coaction with the item entering mechanism, said selecting circuits controlling the first named circuits to cause the driver to move the support the shortest distance from a previous position to the position in which a selected totalizer coacts with the item entering mechanism.

LYNUS CLYDE REYNOLDS.